United States Patent
Danne et al.

(10) Patent No.: US 7,316,300 B2
(45) Date of Patent: Jan. 8, 2008

(54) VEHICLE BRAKE AND METHOD FOR ACTUATING A VEHICLE BRAKE

(75) Inventors: Ulrich Danne, Bendorf (DE); Leo Gilles, Koblenz (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 11/270,111

(22) Filed: Nov. 9, 2005

(65) Prior Publication Data

US 2006/0054428 A1    Mar. 16, 2006

Related U.S. Application Data

(63) Continuation of application No. PCT/EP2004/004770, filed on May 5, 2004.

(30) Foreign Application Priority Data

May 9, 2003   (DE) ................. 103 20 884

(51) Int. Cl.
*F16D 55/08* (2006.01)

(52) U.S. Cl. .............. 188/72.1; 188/31; 188/162; 188/265

(58) Field of Classification Search ........ 188/72.1, 188/72.7, 72.8, 82.8, 82.84, 156, 157, 158, 188/161, 162, 163, 265, 31
See application file for complete search history.

(56) References Cited

U.S. PATENT DOCUMENTS 4,927,212 A * 5/1990 Harrison et al. ......... 303/115.2

| 5,148,894 | A  |   | 9/1992  | Eddy, Jr.      |          |
|-----------|----|---|---------|----------------|----------|
| 6,257,377 | B1 | * | 7/2001  | Schumann ...... | 188/72.8 |
| 6,315,092 | B1 | * | 11/2001 | Schwarz ........ | 188/265  |
| 6,349,801 | B1 | * | 2/2002  | Koth et al. .... | 188/72.8 |
| 6,405,836 | B1 |   | 6/2002  | Rieth et al.   |          |
| 6,536,561 | B1 |   | 3/2003  | Keller         |          |
| 6,752,249 | B1 |   | 6/2004  | Jungbecker et al. | |

FOREIGN PATENT DOCUMENTS

| DE | 198 51 670 | 5/2000 |
| DE | 199 44 876 | 3/2001 |
| DE | 199 45 543 | 3/2001 |
| EP | 0 551 397  | 7/1993 |
| EP | 1 203 895  | 5/2002 |
| EP | 1 291 541  | 3/2003 |

* cited by examiner

*Primary Examiner*—Pam Rodriguez
(74) *Attorney, Agent, or Firm*—MacMillan, Sobanski & Todd, LLC

(57) ABSTRACT

In a vehicle brake comprising a housing, a brake piston, which is accommodated in the housing and on which a brake lining is fitted, and a blocking device, it is provided that the brake piston is displaceable in the housing by means of an actuating device and that the brake piston is securable relative to the housing by means of the blocking device. In this vehicle brake, it is further provided that the blocking device comprises an electromechanical latching arrangement, which is actuable in such a way that in a latching position it prevents a displacement of the brake piston inside the housing and in a release position it enables a movement of the brake piston in the housing.

18 Claims, 6 Drawing Sheets

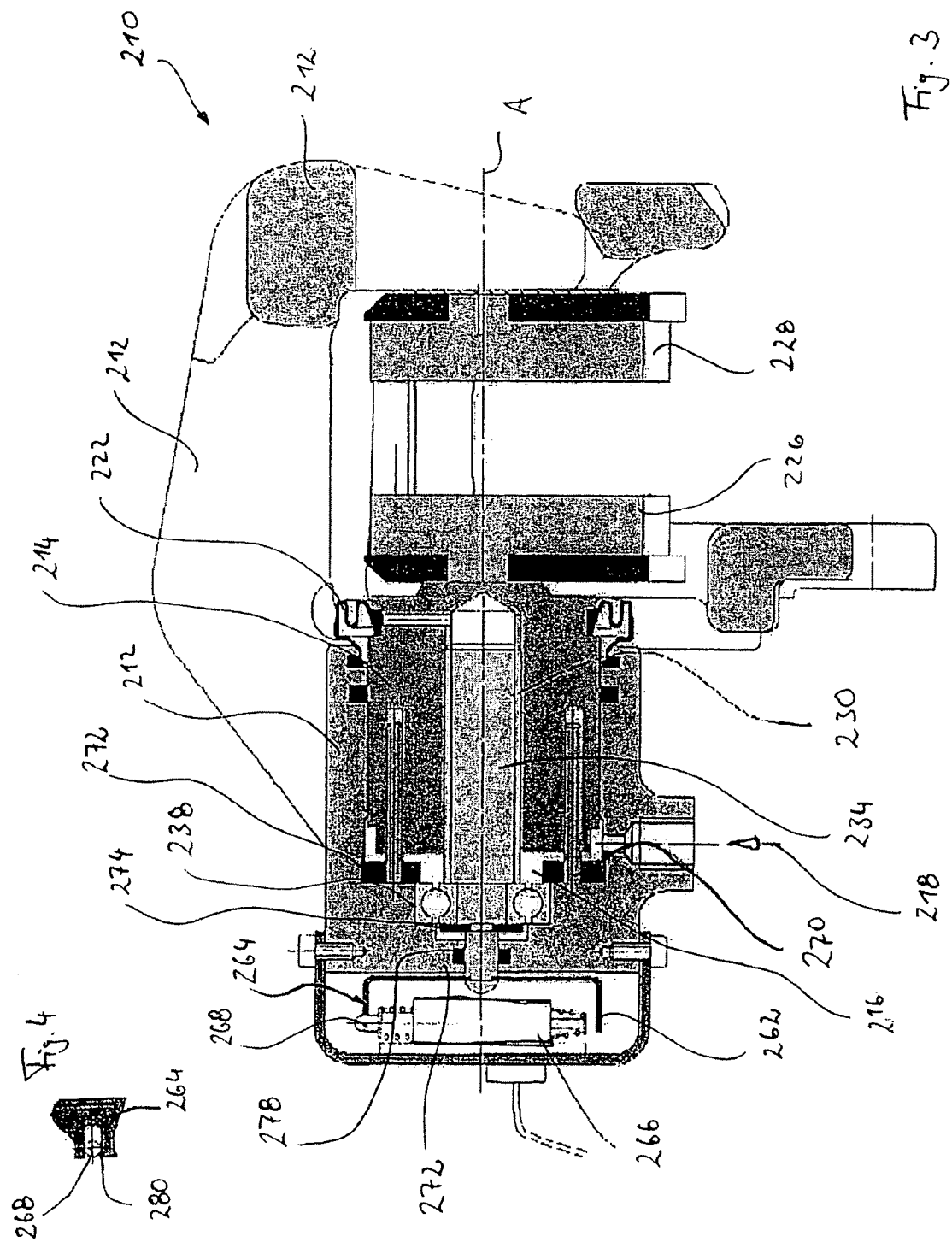

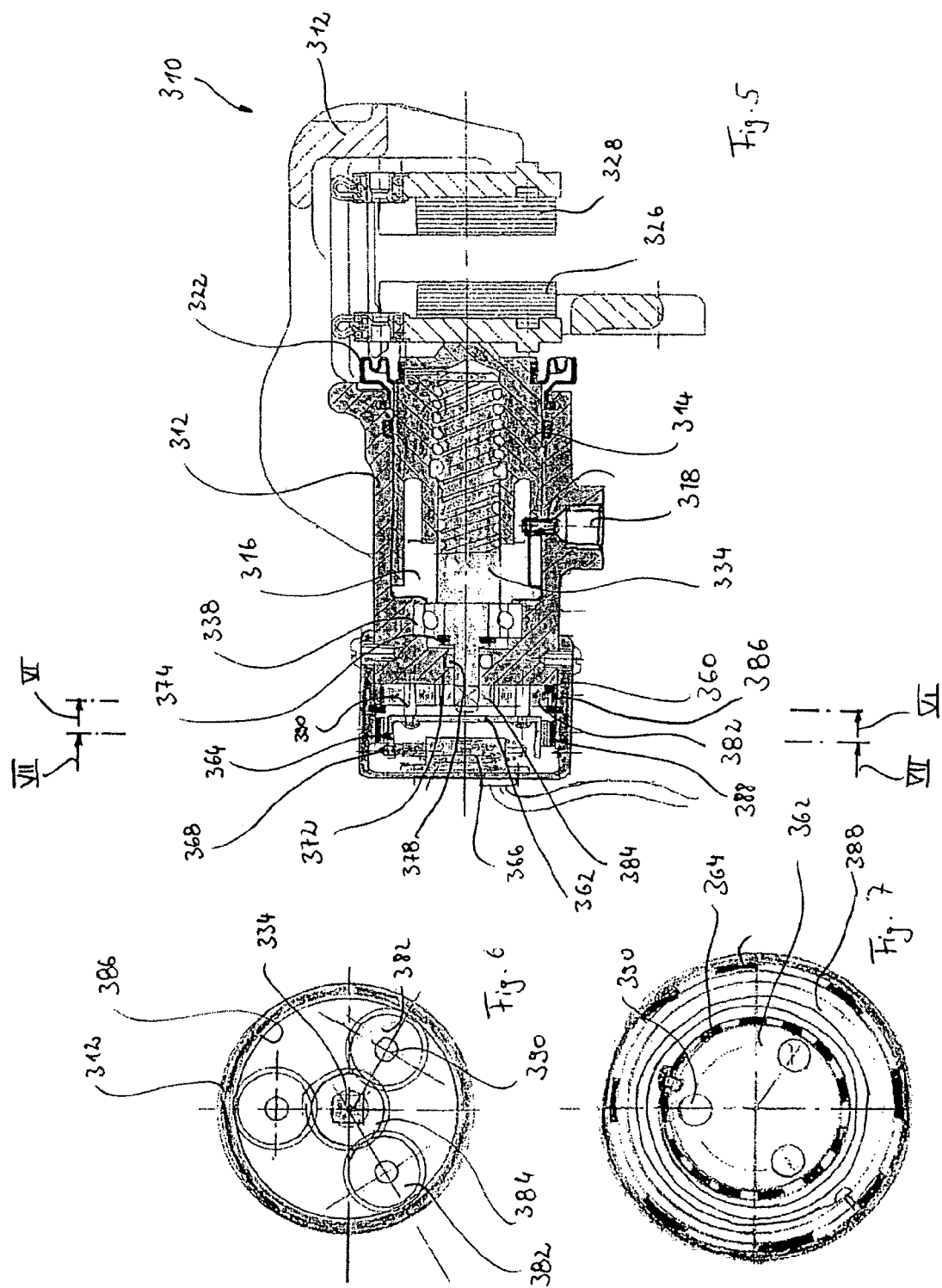

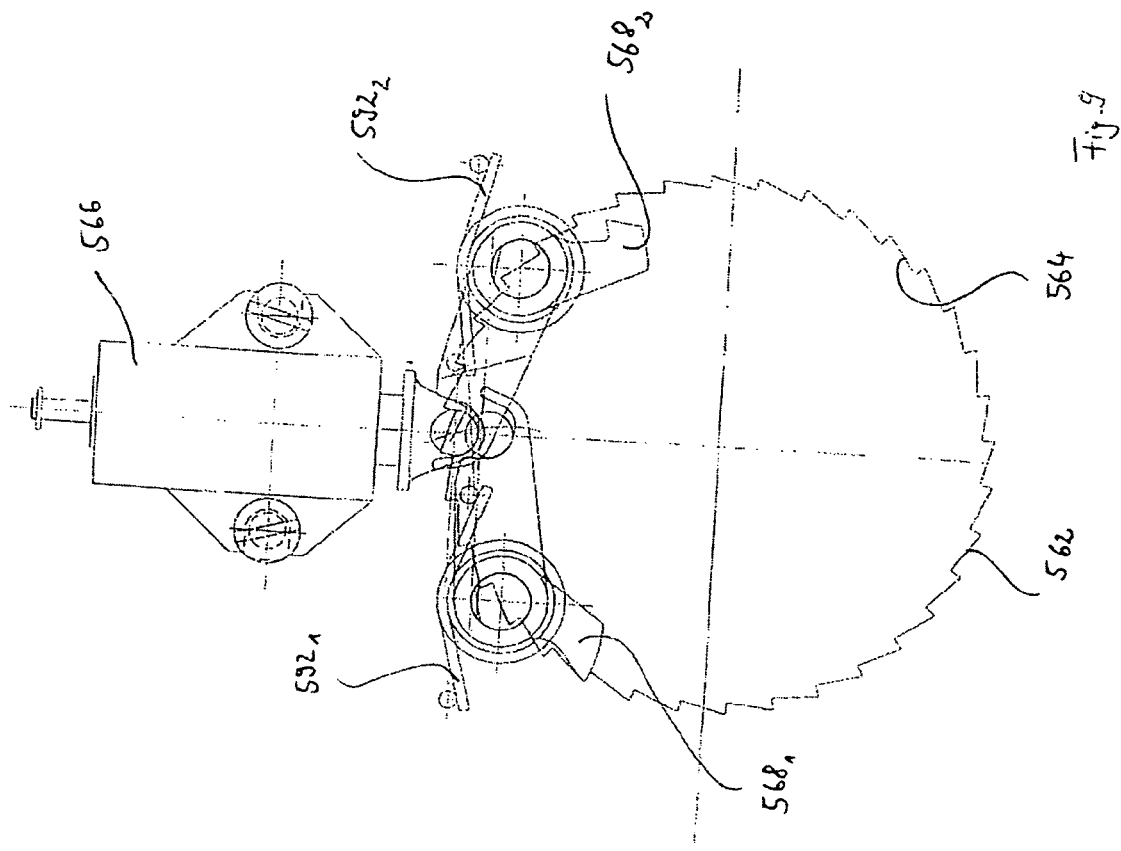
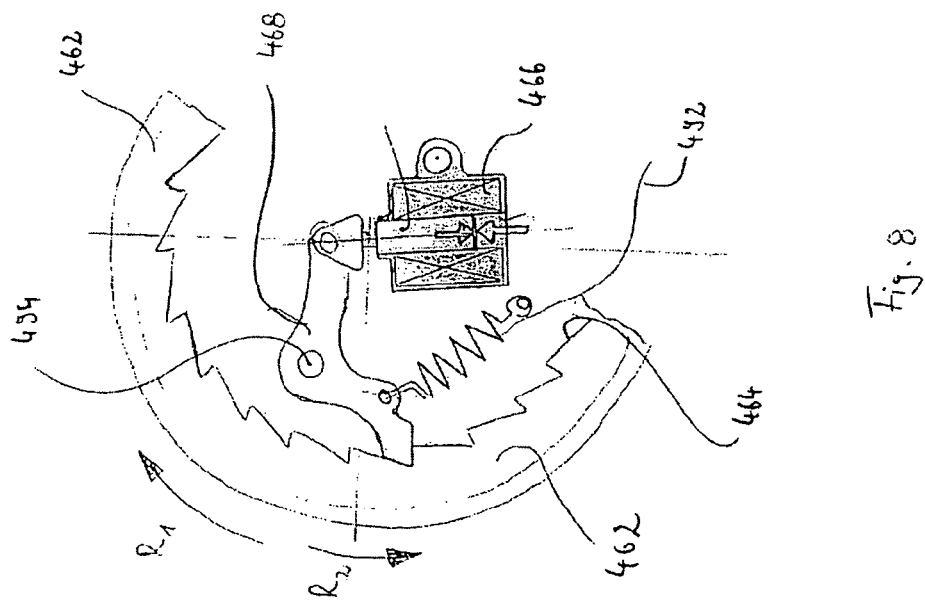
Fig. 9
Fig. 8

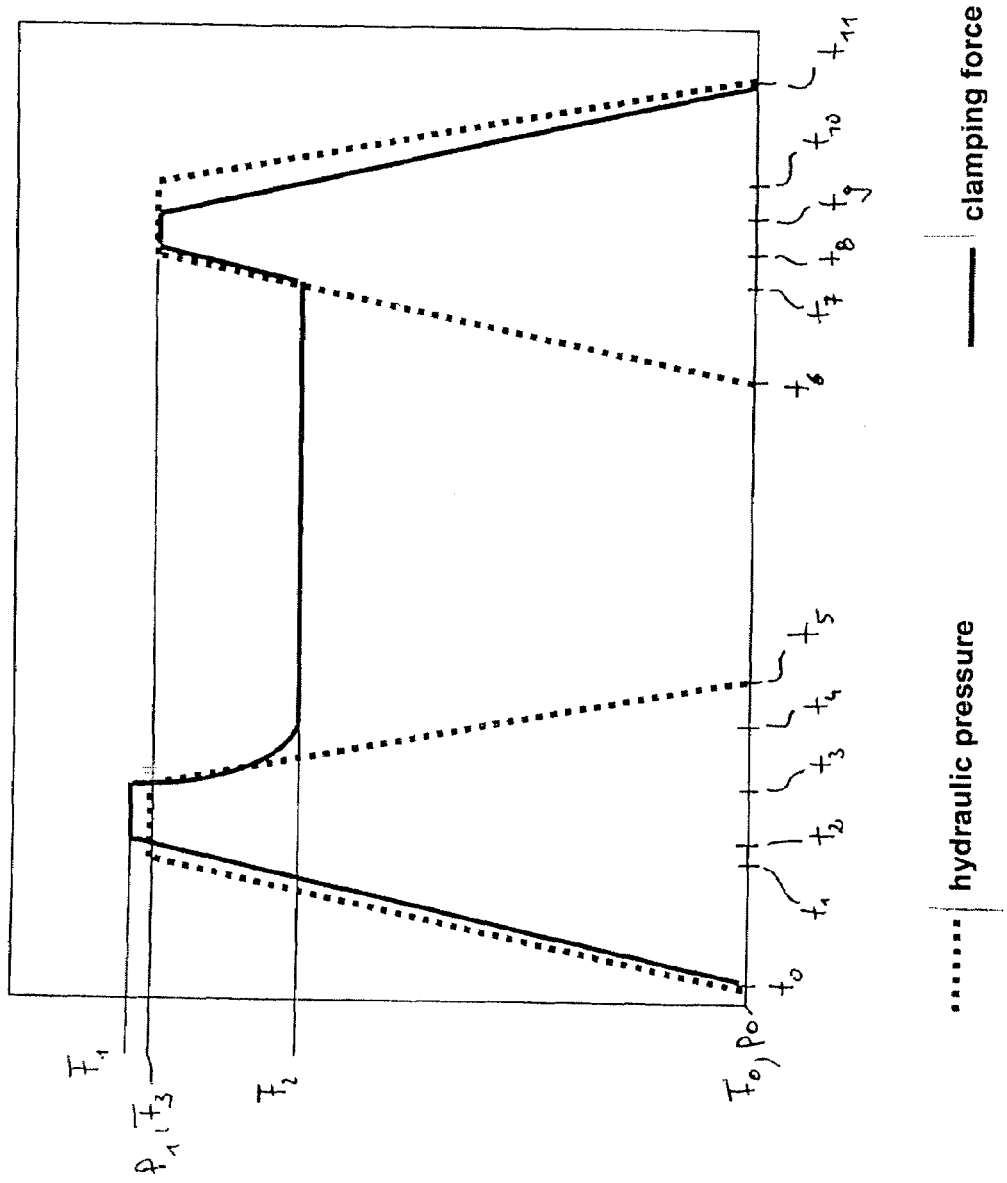

VEHICLE BRAKE AND METHOD FOR ACTUATING A VEHICLE BRAKE

CROSS-REFERENCE TO RELATED APPLICATIONS

This application is a continuation of International Application No. PCT/EP2004/004770 filed May 5, 2004, the disclosures of which are incorporated herein by reference in entirety, and which claimed priority to German Patent Application No. 103 20 884.4 filed May 9, 2003, the disclosures of which are incorporated herein by reference in entirety.

BACKGROUND OF THE INVENTION

The invention relates to a vehicle brake comprising a housing, a brake piston, which is accommodated in the housing and on which a brake lining is fitted, and a blocking device, wherein the brake piston is displaceable in the housing by means of an actuating device and wherein the brake piston is securable relative to the housing by means of the blocking device.

Such a vehicle brake is known for example from the European patent EP 0 551 397, and corresponding U.S. Pat. No. 5,148,894 A1, both of which are incorporated by reference herein in entirety. With this vehicle brake, in a service braking situation, i.e. when a brake disc coupled to a vehicle wheel is to be braked to decelerate the vehicle wheel, a brake piston is displaced relative to the housing and pressed against the brake disc by feeding hydraulic fluid into the fluid chamber. The brake force then exerted on the brake disc is dependent upon the magnitude of the hydraulic pressure prevailing in the fluid chamber. At the end of the service braking situation, hydraulic fluid is discharged from the fluid chamber, thereby allowing the brake piston with its brake lining to move away from and release the brake disc. In a parking braking situation, in which a vehicle equipped with such a brake is to be prevented from unintentionally rolling away by firmly clamping the stationary brake disc against unintentional rotation, in this vehicle brake first the brake piston is again fed towards and pressed against the brake disc by feeding hydraulic fluid into the fluid chamber. Then a motor-driven blocking rod is displaced inside the housing and brought into contact with the brake piston. The blocking rod is supported by a self-locking thread pairing in the housing. The effect achievable thereby is that the blocking rod under the action of axial forces is blocked in its axial position. This effect is utilized to block the brake piston in its brake application position. After the brake piston has been contacted by the blocking rod, hydraulic fluid may be discharged from the fluid chamber, wherein the blocking rod holds the brake piston in its braking position. The hydraulic fluid circuit is therefore relieved and the parking braking function of the vehicle brake is activated. To cancel the parking braking function, the fluid chamber is filled anew with hydraulic fluid until the hydraulic pressure prevailing therein is high enough for the brake piston to release the blocking rod. The blocking rod may then be displaced mechanically into its basic position. The hydraulic fluid is subsequently discharged from the fluid chamber, with the result that the brake piston may readopt its braking-effect-free basic position. For displacement of the actuating rod, according to this patent an electromotive drive is required, thereby lending the entire arrangement a relatively complicated construction. The required electric motor is moreover an additional load on the electrical system of a motor vehicle.

BRIEF SUMMARY OF THE INVENTION

The problem of the present invention is to provide a vehicle brake of the initially described type that combines a simple and compact construction with fast and reliable activation of the parking braking function.

In a vehicle brake of the initially described type, this problem is solved in that the blocking device comprises an electromechanical latching arrangement, which is actuable in such a way that in a latching position it prevents a displacement of the brake piston inside the housing and in a release position it enables the brake piston to move in the housing.

Thus, the conventional measures for activating a service braking function, during which the brake piston is displaced inside the housing, may be used also to activate the service braking function. Once the brake piston has been fed towards and pressed against a brake disc of the vehicle brake in such a manner, the latching arrangement may then be activated, by means of which the brake piston is blocked in the housing and secured in its currently fed position.

With regard to the mechanical construction of the latching arrangement, it may be provided that it comprises a detent element arrangement having at least one detent element, which is displaceable between a detent element position associated with the locking position and a detent element position associated with the release position and which is latchable through self-locking engagement with a detent-element working surface of a counterpart detent component drive-connected to the brake piston. In order to bring about a defined position in the unloaded state, in a development of the invention the at least one detent element may be biased into its detent element position associated with the release position by means of a spring element. For actuating the latching arrangement, the at least one detent element may be displaceable between its detent element position associated with the latching position and its detent element position associated with the release position by means of an electromechanical actuator.

An advantageous development of the invention provides that two detent elements are actuable by means of the electromechanical actuator, wherein the distance between the detent elements and the pitch of the counterpart detent component designed with a plurality of detent-element working surfaces are tuned in such a way to one another that in the locking position only one of the detent elements is in self-locking engagement with one of the detent-element working surfaces and the, in each case, other detent element in said case engages without self-locking between two adjacent detent-element working surfaces. In this way, it is possible to achieve a doubling of the detent stages, i.e. a refinement of the distances between individual detent positions.

In a form of construction of the invention, it may be provided that the at least one detent element is formed by a pawl and that the detent-element working surfaces of the counterpart detent component take the form of detent teeth. Alternatively, the at least one detent element may be formed by a detent pin and the detent-element working surfaces of the counterpart detent component may take the form of detent-pin recesses.

For the drive connection of brake piston and counterpart detent component, a constructional variant of the invention provides that the brake piston is connected by a self-unlocking thread pairing to a blocking element of the blocking device. In said case, the self-unlocking thread pairing may be formed by an external thread, which is provided on a threaded bolt fastened to the brake piston, and an internal thread, which is provided on a locating bush fastened to the blocking element. Alternatively, in a further constructional variant of the invention, it may be provided that the self-unlocking thread pairing is formed by an internal thread, which is provided on the brake piston, and an external thread, which is provided on the blocking element.

For reducing the forces arising at the latching arrangement, a development of the invention provides that the blocking element is drive-connected to the counterpart detent component by a gear device, in particular by a planetary gear. In said case, it may be provided that the blocking element is connected in a rotationally fixed manner to a sun wheel of the planetary gear, that moreover the counterpart detent component is connected in a rotationally fixed manner to a planet carrier of the planetary gear and that the ring gear of the planetary gear is formed in or connected in a rotationally fixed manner to the housing. Alternatively, it may be provided that the blocking element is connected in a rotationally fixed manner to a planet carrier of the planetary gear, that moreover the counterpart detent component is connected in a rotationally fixed manner to a sun wheel of the planetary gear and that the ring gear of the planetary gear is formed in or connected in a rotationally fixed manner to the housing. For further reducing the forces arising at the latching arrangement, it may be provided that the planetary gear is of a multi-step design.

The actuating device may be of a hydraulic design, wherein the brake piston with the housing delimits a fluid chamber, which via a hydraulic fluid circuit is chargeable with hydraulic fluid, so that for actuation of the vehicle brake the brake piston is hydraulically displaceable inside the housing along a piston longitudinal axis. Equally, in a form of construction according to the invention, it is possible for the actuating device to be an electro-mechanical design, wherein for actuation of the vehicle brake the brake piston is displaceable inside the housing along a piston longitudinal axis through activation of an electric motor.

For supporting the blocking element rotatably in the housing, a radial bearing arrangement or/and thrust bearing arrangement may be provided.

For operation of the vehicle brake according to the invention, it may be provided that in a service braking situation the brake piston is displaceable inside the housing by activating the actuating device and that in a parking braking situation first the brake piston is displaced inside the housing by activating the actuating device, then the blocking device is actuated and the brake piston is blocked inside the housing and finally the actuating device is deactivated. For cancelling the parking braking situation, the actuating device may then be reactivated until the blocking element releases the brake piston and finally the brake piston is returned to its braking-effect-free basic position.

The invention further relates to a method of actuating a vehicle brake of the previously described type, whereby in a service braking situation the brake piston is displaceable inside the housing by activating the actuating device and in a parking braking situation first the brake piston is displaced inside the housing by activating the actuating device, then the blocking device is actuated and the brake piston is blocked inside the housing and finally the actuating device is deactivated. In this method according to the invention, it may further be provided that for cancelling the parking braking situation the actuating device is activated until the blocking element releases the brake piston and finally the brake piston is returned to its braking-effect-free basic position.

Other advantages of the invention will become apparent to those skilled in the art from the following detailed description of the invention, when read in light of the accompanying drawings.

BRIEF DESCRIPTION OF THE DRAWINGS

FIG. 3 a diagrammatic longitudinal section through a third embodiment of the vehicle brake according to the invention;

FIG. 4 a detail plan view according to arrow IV of FIG. 3;

FIG. 5 a diagrammatic longitudinal section through a fourth embodiment of the vehicle brake according to the invention;

FIG. 6 a section orthogonal to the axis along the cutting line VI of FIG. 5;

FIG. 7 a section orthogonal to the axis along the cutting line VII of FIG. 5;

FIG. 8 a detail view of a latching arrangement for the vehicle brake according to the invention;

FIG. 9 a detail view of an alternative latching arrangement for the vehicle brake according to the invention and FIG. 10 a diagrammatic representation of the pressure characteristic and the clamping force characteristic in the vehicle brake according to FIGS. 2 to 9.

DETAILED DESCRIPTION OF THE INVENTION

Figure 1:
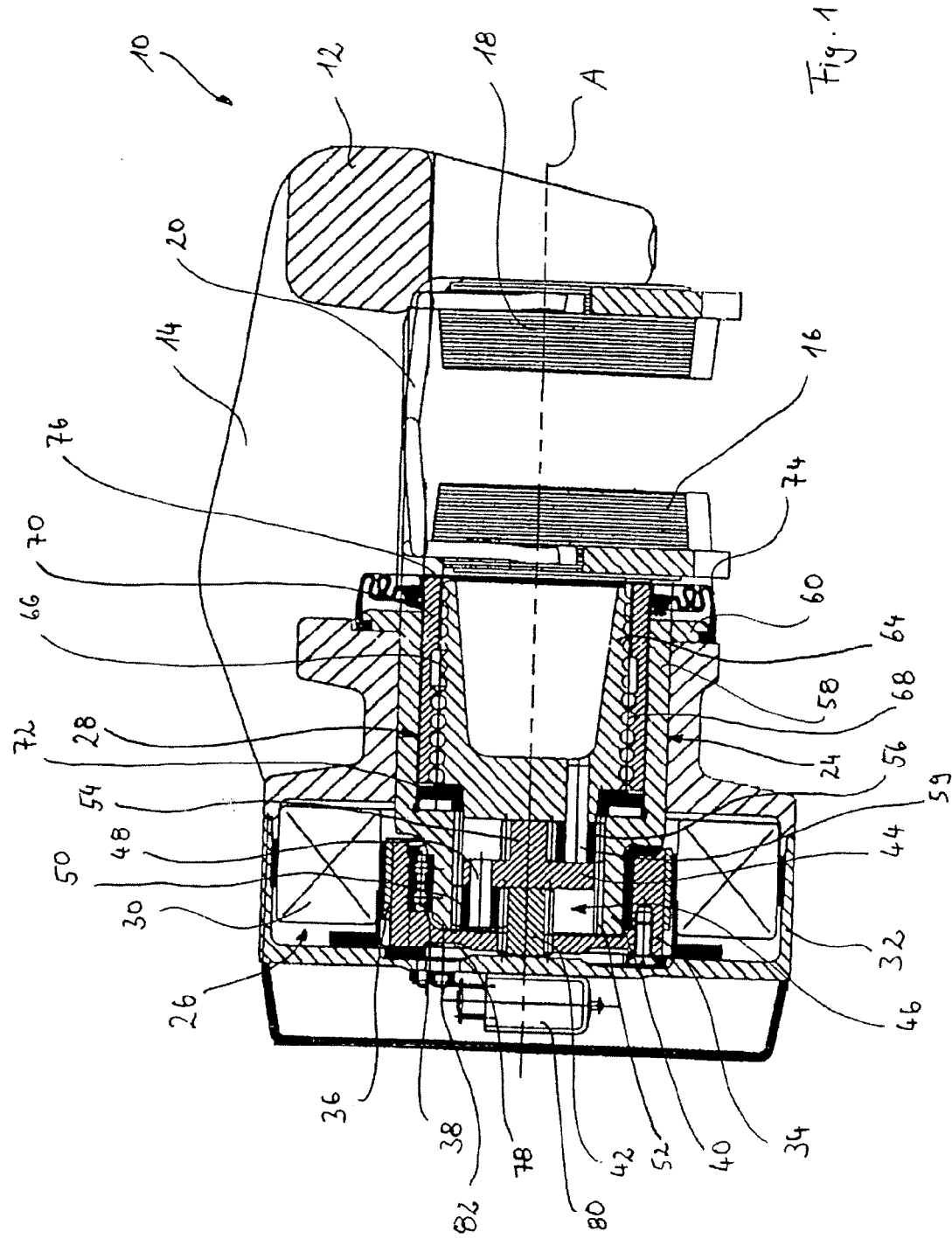
FIG. 1 a diagrammatic longitudinal section through a first embodiment of the vehicle brake according to the invention.

In FIG. 1 a first embodiment of a vehicle brake according to the invention is shown in longitudinal section and generally denoted by 10. The vehicle brake 10, as will be additionally explained below in detail, is actuated electromechanically. It takes the form of a disc brake of the floating caliper type. For this purpose, the vehicle brake 10 comprises a housing 12 with a floating caliper region 14. In the floating caliper region 14 a first brake lining 16 and a second brake lining 18 are disposed. The two brake linings 16 and 18 are resiliently connected to one another by a release play spring 20, wherein the release play spring 20 attempts to push the two brake linings 16 and 18 apart from one another. Accommodated between the two brake linings 16 and 18 is a brake disc (not shown), which is connected at its radially inner region to a vehicle wheel (likewise not shown) that is to be braked. The brake lining 18 is fitted on the floating caliper region 14 of the housing 12 so as to be displaceable in the direction of the longitudinal axis A. The brake lining 16 is supported opposite so as to be displaceable in the direction of the longitudinal axis A.

The displacement of the brake lining 16 in the direction of the longitudinal axis A is effected by means of an electrically actuable actuator 24. The electrically actuable actuator 24 comprises an electric motor 26 and a self-unlocking spindle/nut gear arrangement 28. The electric motor 26 takes the form of an internal-rotor motor. It comprises a stator 30, which is accommodated in a housing lid 32 fastened to the housing 12. Situated radially inside the stator 30 is a rotor 34, which on its radially outer peripheral surface has permanent magnets 36, by means of which it is mechanically driven in the magnetic field built up upon energization of the stator. The rotor 34 is supported via a bearing arrangement 38 on an axial extension 40 of a bearing bush 58 fixed in the housing 12 and hence rotatably relative to the housing 12 about the axis A. In its radially inner region, the rotor 34 is connected in a rotationally fixed manner to an externally geared bolt 42. This bolt 42 extends in axial direction centrally in the direction of a planet carrier 44 of a planetary gear 46.

The planet carrier 44 holds planet wheels 50 by means of bearing pins 48, wherein the axes of rotation of the bearing pins 48 extend parallel to the longitudinal axis A. The planet wheels 50 at their, in relation to the longitudinal axis A, radially inner region are in mesh with the externally geared bolt 42. In their, in relation to the longitudinal axis A, radially outer region the planet wheels 50 are in mesh with ring gear teeth 52, which are formed on the axial extension of the bearing bush 58. The bearing bush 58 on its end remote from the internal gearing 52 has a flanged portion 60, by which it is supported in axial direction against the housing.

The planet carrier 44 on its, in FIG. 1, right side has a bolt-shaped axial extension 54, which is provided with external gearing. In mesh with this external gearing are further planet wheels 56, which further mesh with the ring gear teeth 52 of the bearing bush 58. The planet wheels 56 are supported by means of bearing pins 59 rotatably against the rear of a spindle 64.

The spindle 64 on its outer peripheral surface has a guideway 66, which extends spirally around the axis A and in which spherical bearing bodies 68 are guided. The spindle 64 is embraced by a nut 70, which likewise has on its inside at least in sections a correspondingly spiral guideway, into which the bearing bodies 68 likewise engage. The spindle 64, the bearing bodies 68 and the nut 70 form the self-unlocking spindle/nut gear arrangement 28.

The spindle 64 is supported via a plain bearing arrangement 72 in the bearing bush 58. The bearing bush 58 moreover guides the nut 70 in the direction of the axis A and prevents misalignment of the nut 70. On the flanged portion 60 of the bearing bush 58 flexible bellows 74 are provided, which interact in a sealing manner with a cover 76 fitted on the nut 70.

The rotor 34 at its, in FIG. 1, left region is provided with spur gearing 78. By means of an electrically controllable lifting magnet 80 a locking element 82 may be brought into engagement with the spur gearing 78, with the result that the rotor 34 is locked against rotation about the longitudinal axis A. The locking element 82 and the lifting magnet 80 are biased into a release position, in which they allow a rotation of the rotor 34. By energizing the lifting magnet 80, the lifting magnet 80 shifts the locking element 82 into a latching position, in which the locking element 82 blocks the rotor 34. The engagement of the locking element 82 into the spur gearing 78 is self-locking, i.e. it is unlockable only under the action of an axial force.

The vehicle brake 10 according to FIG. 1 in a service braking situation, in which a rotating brake disc is to be braked, operates as follows. Upon energization of the electric motor 26, the rotor 34 rotates about the axis A with low friction, owing to the bearing arrangement 38. The rotation of the rotor 34 causes first the bolt 42 and, with it, the planet wheels 50 to be driven. These roll in the internal gearing 52 of the bearing bush 58 serving as a fixed ring gear, with the result that the planet carrier 44 rotates about the axis A, but at a different rotational speed from the rotational speed of the rotor 34. The rotation of the planet carrier 44 is transmitted via the axial extension 54 and the planet wheels 56, which likewise roll in the internal gearing 52 of the bearing bush 58 serving as a fixed ring gear, to the spindle 64. The spindle 64 rotates with low friction inside the bearing bush 58. Owing to the rotation of the spindle 64, the nut 70 guided linearly in the bearing bush 58 is displaced in the direction of the longitudinal axis A. This means that the nut 70 is displaced axially in the direction of the longitudinal axis A because of the two guideways of the spindle 64 and the nut 70 by the agency of the bearing bodies 68 and therefore presses via the cover 76 upon the brake lining 16. The brake linings 16 and 18 as a result of this pressure act in a floating manner upon the brake disc 22 and are applied against both sides thereof, with the result that the brake disc 22 is braked because of the frictional effect thus generated. When this braking effect is to be reduced or cancelled, the electric motor 26 is no longer energized or is even energized with reverse polarity. This leads to a reversible movement of the nut 70 along the spindle 64.

In the case of a parking braking situation, in which a stationary brake disc is to be locked against unintended rotation, the brake linings 16 and 18 are first pressed against the non-illustrated brake disc. This is effected by energizing the electric motor 26, in the manner described above for the service braking situation. Once a sufficiently high clamping force has been reached at the brake disc, the lifting magnet 80 is then activated. The lifting magnet 80 pushes the locking element 82 into its latching position, with the result that the rotor 34 is locked against rotation. This prevents a resetting motion of the brake piston 14 and hence of the brake linings 16 and 18. The vehicle brake 10 remains in its applied position without any need for further energization of the electric motor 26. By virtue of the action of the two-step planetary gear 46, the peripheral force acting upon the locking element may be kept low. To cancel the parking braking situation, the lifting magnet 80 is activated so that it pulls the locking element 82 out of its latching position. The vehicle brake may then move back into its basic position shown in FIG. 1.

Figure 2:
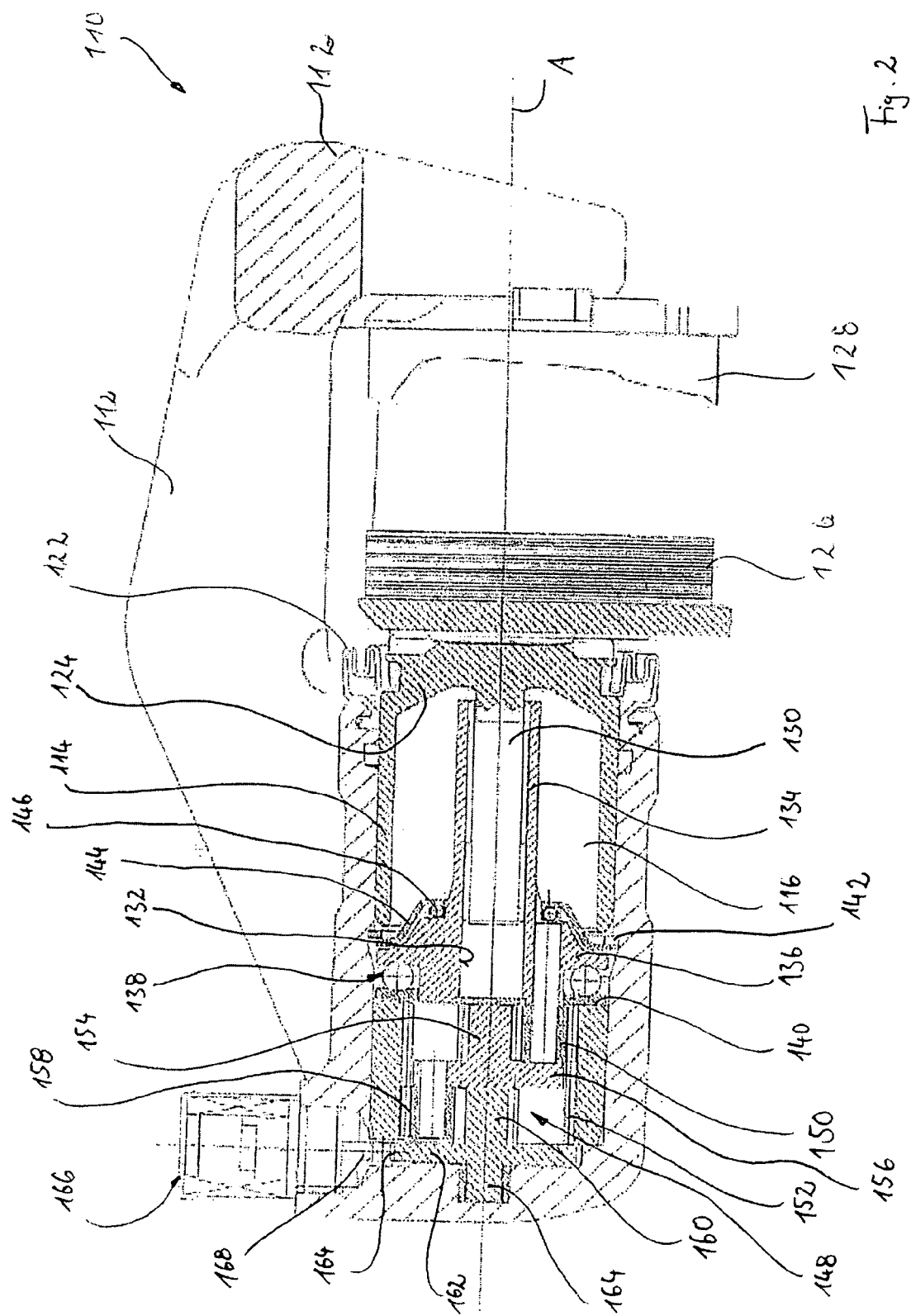
FIG. 2 a diagrammatic longitudinal section through a second embodiment of the vehicle brake according to the invention.

In FIG. 2 a second embodiment of a vehicle brake according to the invention is denoted by 110. The vehicle brake 110 comprises a housing 112, in which a brake piston 114 is guided displaceably in the direction of a piston longitudinal axis A. The brake piston 114 with the housing 112 encloses a fluid chamber 116, to and/or from which hydraulic fluid is feedable and/or dischargeable through a non-illustrated hydraulic fluid line of a hydraulic fluid circuit. The brake piston 114 guided in the housing 112 is connected at its, in FIG. 2, right front end by bellows 122 to the housing 112, so that the housing interior is screened off to prevent dirt from penetrating. Disposed on the front end 124 of the brake piston 114 is a brake lining 126, which is displaceable in the housing 112. Disposed opposite the brake lining 126 is a second brake lining 128, which is likewise displaceable in the housing 112. The brake linings 126 and 128 are supported in the housing 112 in accordance with a conventional floating caliper arrangement so that, when the brake lining 126 is displaced by means of the brake piston 114, the brake lining 128 is displaced equally, but in the opposite direction. Thus, a non-illustrated rotating brake disc disposed between the brake linings 126 and 128 may be clamped in between the brake linings 126 and 128 and therefore braked.

Disposed on the brake piston 114 in its radially inner region is a threaded bolt 130. The threaded bolt 130 is accommodated by its external thread in a threaded location bore 132 of a shank portion of a blocking element 134. The internal thread of the threaded location bore 132 in the blocking element 134 together with the external thread of the threaded bolt 130 forms a self-unlocking thread pairing.

The blocking element 134 further has a flange 136, which extends radially outwards. By means of the flange 136, the blocking element 134 is supported via a thrust bearing 138 in axial direction in FIG. 2 to the left against a shoulder 140 of the housing 112. At the side of the flange 136 remote from the thrust bearing 138, a cup-shaped spring plate 144 is fitted in the housing 112 by means of a locking ring 142 fixed in the housing 112. Disposed between the spring plate 144 and the flange 136 is a further thrust bearing 146, which lies radially within the region, by which the spring plate 144 is supported via the locking ring 142 against the housing 112.

On its side remote from the brake piston 114, the blocking element 134 is connected to a planetary gear 148, which is of a similar design to the planetary gear 46 of FIG. 1. The planetary gear 148 comprises planet wheels 150, which are supported rotatably against the blocking element 134 and which engage, in relation to the longitudinal axis A, radially at the outside into housing-fixed ring gear teeth 152 and mesh, in relation to the longitudinal axis A, radially at the inside with a sun wheel 154. The sun wheel 154 is formed in a rotationally fixed manner on a planet carrier 156. Supported rotatably on the planet carrier 156 are further planet wheels 158, which engage, in relation to the longitudinal axis A, radially at the outside into the housing-fixed ring gear teeth 152 and mesh, in relation to the longitudinal axis A, radially at the inside with a sun wheel 160. The sun wheel 160 is formed in a rotationally fixed manner on a detent disk 162, which is supported via a bearing pin 164 rotatably in the housing 112. The detent disk on its radial peripheral surface has detent teeth 164. In the housing 112 an electrically controllable lifting magnet 166 is provided, which has a detent pin 168. The detent pin 168 may be brought counter to a spring bias into self-locking engagement with the detent teeth 164.

There now follows a detailed description of the operation of the vehicle brake 110 according to the invention of FIG. 2.

In a service braking situation, in which a non-illustrated rotating brake disc disposed between the brake linings 126 and 128 is to be braked, the fluid chamber 116 is charged through the hydraulic fluid line with hydraulic fluid from the hydraulic fluid circuit, with the result that the brake piston 114 is displaced in FIG. 2 along the piston longitudinal axis A. In said case, the brake linings 126 and 128 are pressed from both sides onto the non-illustrated brake disc, which is accordingly braked. To cancel the braking effect, hydraulic fluid is discharged from the fluid chamber 116 through the fluid line.

For the description of a parking braking situation, in which the non-illustrated brake disc disposed between the brake linings 126 and 128 is stationary and is to be locked against unintended rotation, reference is additionally made to FIG. 10.

In the parking braking situation, at time $t_0$ the fluid chamber 116 is charged through the fluid line with hydraulic fluid from the hydraulic fluid circuit. The brake piston 114 is therefore moved in FIG. 2 to the right and displaces the brake linings 126 and 128 in a conventional manner towards one another, such that they press upon the brake disc. The hydraulic pressure in the fluid chamber 116 is increased from the value $p_0$ (0 bar) to the value $p_1$ (for example 160 bar). The brake piston 114 is therefore pressed in FIG. 2 to the right to such an extent that a clamping force $F_1$ is generated at the brake disc. The hydraulic pressure in the fluid chamber 116 is then maintained at the value $p_1$.

At time $t_2$ the lifting magnet 166 is activated, with the result that the detent pin 168 is brought into engagement with the detent teeth 164. Rotation of the detent disk 162 and hence of the entire planetary gear 148 is therefore blocked. This means that a displacement of the brake piston 114 in the housing 112 is also blocked. Then, at time $t_3$ hydraulic fluid is discharged from the fluid chamber 116, with the result that the pressure prevailing in the fluid chamber 116 drops from the value $p_1$ to the value $p_0$, which is reached at time $t_5$. Owing to the reduction of the hydraulic pressure prevailing in the fluid chamber 116, the brake piston 114 moves slightly in FIG. 2 to the left in the direction of its basic position. In said case, the clamping force acting upon the brake disc is reduced, i.e. it drops from the value $F_1$ to the value $F_2$. This may be explained by the occurrence of mechanical setting operations. This may in particular be explained by the fact that because of the slight axial movement of the brake piston 114 in FIG. 2 to the left the blocking element 134, driven by the thread pairing of the threaded bolt 130 and the blocking element 134, may rotate slightly until the detent teeth 164 move into self-locking engagement with the detent pin 168. Once this state has been reached, further rotation of the blocking element 134 about the piston longitudinal axis A is prevented by the mutual engagement of detent teeth 164 and detent pin 168. This state is reached at time $t_4$. The brake piston 114 in this state is secured in its axial position inside the housing 112.

Once the self-locking engagement of detent teeth 164 and detent pin 168 has been established, the energizing of the lifting magnet 166 may also be cancelled.

In this state, the blocking element 134 is locked against rotation about the piston longitudinal axis A. The brake linings 126 and 128 press with the clamping force $F_2$ upon the brake disc. The parking braking function is activated.

To cancel the parking braking function, at a time $t_6$ hydraulic fluid is fed through the hydraulic fluid line to the fluid chamber 116 and the hydraulic pressure in the fluid chamber 116 is increased from the value $p_0$ to the value $p_1$. In said case, the clamping force rises from the value $F_2$ to the clamping force value $F_3$. The brake piston 114 is mechanically uncoupled from the blocking device 134. The blocking device 134 consequently rotates slightly, with the result that the detent teeth 164 and the detent pin 168 may move out of their self-locking engagement, displaced by the bias acting upon the detent pin 168. The blocking element 134 is therefore no longer blocked by the planetary gear 148 and is rotatable inside the housing 112. Subsequently, at time $t_{10}$ hydraulic fluid may be discharged from the fluid chamber 116 until the hydraulic pressure prevailing therein drops from the value $p_1$ to the value $p_0$. In parallel, the clamping force transmitted via the brake linings 126 and 128 drops to the value $F_0$, so that the vehicle brake 110 is once more in its braking-effect-free basic state shown in FIG. 2.

In FIGS. 3 and 4 a third embodiment of the invention is shown. This is similar to the second embodiment according to FIG. 2. For this reason, in the following only the differences from the embodiment according to FIG. 2 are described, wherein for components of identical type or identical effect the same reference characters as for the description of the second embodiment are used, only prefixed by the number "2".

One difference is that the blocking element 234 is designed with a threaded bolt 230, which is accommodated in an internal thread formed in the brake piston 214, thereby forming a self-unlocking thread pairing. The brake piston 214 is guided in a rotationally fixed manner in the housing 212 by means of guide pins 270 fastened to the housing 212. FIG. 3 also shows the hydraulic fluid feed line 218.

The blocking element 234 is supported rotatably about the piston longitudinal axis A in the housing 212 by means of the bearing arrangement 238. The bearing arrangement 238 is secured axially by means of a piston damping element 274 and a locking ring 276. The blocking element 234 extends through a wall portion 272, in which it is guided in a fluid-proof manner by means of a sealing element 278. On the, in FIG. 3, left end of the blocking element 234 a detent disk 262 is fitted in a rotationally fixed manner. The detent disk 262 is of a dish-shaped design and has on its radial peripheral region detent teeth 264 with recesses 280, into which a detent pin 268 of a lifting magnet 266 may engage upon activation of the lifting magnet 266. A plurality of such recesses 280 are provided over the circumference of the detent disk 262.

During operation the vehicle brake 210 functions analogously to the vehicle brake 110 of FIG. 2, wherein owing to the absence of the planetary gear higher forces act upon the detent pin 268. What was said with regard to FIG. 10 applies equally to the vehicle brake 210. It should additionally be noted that, given a very fine pitch of the detent disk 262 with recesses 280, the setting operations mentioned in the description in FIG. 10 may be minimized and so the magnitude of the drop in the clamping force from $F_1$ to $F_2$ may be kept low.

In FIGS. 5 to 7 a fourth embodiment of the vehicle brake according to the invention is shown and generally denoted by 310. This embodiment is similar to the second and third embodiment according to FIGS. 2 to 4. For this reason, in the following only the differences from the embodiments according to FIGS. 2 to 4 are described, wherein for components of identical type or identical effect the same reference characters as for the description of the previous embodiments are used, but prefixed by the number "3".

In the fourth embodiment according to FIGS. 5 to 7, the blocking element 334 is likewise connected by a planetary gear 360 to the detent disk 362. The planetary gear 360 comprises a sun wheel 384 fitted in a rotationally fixed manner on the blocking element, three planet wheels 382 meshing with the sun wheel 384 and supported by bearing pins 390 rotatably on the detent disk 362 serving as a planet carrier, and a sun wheel 386, which is fitted in a rotationally fixed manner in the housing 312 and with which the planet wheels 382 mesh.

A further characteristic feature of the fourth embodiment according to FIGS. 5 to 7 is that the detent disk 362 is connected by a spiral spring 388 to the housing 312. The spiral spring 388 is tensioned when the brake piston 314 is displaced towards the non-illustrated brake disc and leads to the build-up of a resetting force, which upon release of the brake piston 314 returns the brake piston 314 actively to its basic position shown in FIG. 5.

Otherwise, the vehicle brake 310 is of the same design as the previously described, hydraulically actuated embodiments, in particular as shown in FIG. 3, and operates in a corresponding manner.

In FIG. 8 a possible latching arrangement according to the invention is shown in detail. In this arrangement a pawl 468, which is supported there by means of a bolt 494 rotatably in the non-illustrated housing, is biased by means of a spring 492 into a release position that is not shown in FIG. 8. By means of the lifting magnet 466 the pawl 468 is displaceable counter to the spring action of the spring 492 into its blocking position shown in FIG. 8, in which it is in engagement with internal gearing 464 of the detent disk 462 and prevents the detent disk 462 from rotating in direction of rotation $R_1$. This direction of rotation $R_1$ corresponds to a cancelling of the braking effect. Rotation in the opposite direction of rotation $R_2$, i.e. further application of the brake, is, however, possible. During cancelling of the latching, the detent disk 462 need merely be rotated slightly in direction $R_2$ for the pawl to be released and returned by the spring 492 to its detent-effect-free release position. The lifting magnet 466 accordingly no longer has to be activated to cancel the latching.

In FIG. 9 an alternative latching arrangement according to the invention is shown in detail. This arrangement comprises two pawls $568_1$ and $568_2$, which are biased into their release position in each case by springs $592_1$ and $592_2$ associated therewith. Both pawls $568_1$ and $568_2$ are actuated by one and the same lifting magnet 566. However, the pawls $568_1$ and $568_2$ are disposed and dimensioned so in tune with the pitch of the internal gearing 564 that there is always only one of the pawls $568_1$ and $568_2$ in self-locking engagement with one of the teeth of the internal gearing 564 and the, in each case, other of the pawls $568_1$ and $568_2$ then lies between two adjacent teeth of the internal gearing 564. Thus, despite a relatively coarse pitch of the internal gearing 564, sufficiently fine detent positions may be provided.

The invention provides a vehicle brake, with which a service braking function may be realized in a conventional manner hydraulically or electromechanically and with which a parking braking function may be activated and/or deactivated utilizing a latching arrangement of a simple design.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. Vehicle brake comprising:
   a housing,
   a brake piston, which is accommodated in the housing and on which a brake lining is fitted, and
   a blocking device,
   wherein the brake piston is displaceable in the housing by means of an actuating device and wherein the brake piston is securable relative to the housing by means of the blocking device,
   wherein the blocking device comprises an electromechanical locking arrangement, which is actuable in such a way that in a latching position it prevents a displacement of the brake piston inside the housing and in a release position it enables a movement of the brake piston in the housing,
   wherein moreover the locking arrangement comprises a detent element arrangement comprising at least one detent element, which is displaceable between a detent element position associated with the locking position and a detent element position associated with the release position,
   wherein the at least one detent element is biased into its detent element position associated with the release position by means of a spring element,
   wherein the at least one detent element is latchable through self-locking engagement with a detent-element working surface of a counterpart detent component drive-connected to the brake piston.

2. Vehicle brake according to claim 1,
wherein the at least one detent element is displaceable between its detent element position associated with the locking position and its detent element position associated with the release position by means of an electromechanical actuator.

3. Vehicle brake according to claim 1,
wherein two detent elements are actuable by means of the electromechanical actuator, wherein the distance between the detent elements and the pitch of the counterpart detent component designed with a plurality of detent-element working surfaces are tuned in such a way to one another that in the locking position only one of the detent elements is in self-locking engagement with one of the detent-element working surfaces and the, in each case, other detent element in said case engages without self-locking between two adjacent detent-element working surfaces.

4. Vehicle brake according to claim 1,
wherein the at least one detent element is formed by a pawl and that the detent-element working surfaces of the counterpart detent component take the form of detent teeth.

5. Vehicle brake according to claim 1,
wherein the at least one detent element is formed by a detent pin and that detent-element working surfaces of the counterpart detent component take the form of detent-pin recesses.

6. Vehicle brake according to claim 1,
wherein the brake piston is connected to a blocking element of the blocking device by a self-unlocking thread pairing.

7. Vehicle brake according to claim 6,
wherein the self-unlocking thread pairing is formed by an external thread, which is provided on a threaded bolt fastened to the brake piston, and by an internal thread, which is provided on a locating bush fastened to the blocking element.

8. Vehicle brake according to claim 6,
wherein the self-unlocking thread pairing is formed by an internal thread, which is provided on the brake piston, and by an external thread, which is provided on the blocking element.

9. Vehicle brake according to claim 6,
wherein the blocking element is drive-connected by a gear device, in particular by a planetary gear, to the counterpart detent component.

10. Vehicle brake according to claim 9,
wherein the blocking element is connected in a rotationally fixed manner to a sun wheel of the planetary gear, that moreover the counterpart detent component is connected in a rotationally fixed manner to a planet carrier of the planetary gear and that the ring gear of the planetary gear is formed in or connected in a rotationally fixed manner to the housing.

11. Vehicle brake according to claim 9,
wherein the blocking element is designed as a planet carrier or is connected in a rotationally fixed manner to a planet carrier of the planetary gear, that moreover the counterpart detent component is connected in a rotationally fixed manner to a sun wheel of the planetary gear and that a ring gear of the planetary gear is formed in or connected in a rotationally fixed manner to the housing.

12. Vehicle brake according to claim 9,
wherein the planetary gear is of a multi-step design.

13. Vehicle brake according to claim 6,
wherein the blocking element is rotatably supported in the housing by means of a radial bearing arrangement.

14. Vehicle brake according to claim 1,
wherein the actuating device is of a hydraulic design, wherein the brake piston with the housing delimits a fluid chamber which is chargeable with hydraulic fluid via a hydraulic fluid circuit, so tat for actuation of the vehicle brake the brake piston is displaceable hydraulically inside the housing along a piston longitudinal axis.

15. Vehicle brake according to claim 1,
wherein the actuating device is of an electromechanical design, wherein for actuation of the vehicle brake the brake piston is displaceable inside the housing along a piston longitudinal axis through activation of an electric motor.

16. Vehicle brake according to claim 1,
wherein the blocking element is rotatably supported in the housing by means of a thrust bearing arrangement.

17. Vehicle brake according to claim 1,
wherein in a service braking situation the brake piston is displaceable inside the housing by activating the actuating device and that in a parking braking situation first the brake piston is displaced inside the housing by activating the actuating device, then the blocking device is actuated and the brake piston is blocked inside the housing and finally the actuating device is deactivated.

18. Vehicle brake according to claim 17, wherein for cancelling the parking braking situation the actuating device is activated until the blocking element releases the brake piston and finally the brake piston is returned to its braking-effect-free basic position.

* * * * *